(12) United States Patent
Iida

(10) Patent No.: US 6,734,990 B1
(45) Date of Patent: May 11, 2004

(54) IMAGE FORMATION APPARATUS AND IMAGE FORMATION METHOD

(75) Inventor: Masaru Iida, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 875 days.

(21) Appl. No.: 09/588,566

(22) Filed: Jun. 7, 2000

(30) Foreign Application Priority Data

Nov. 10, 1999 (JP) .......................................... 11-319957

(51) Int. Cl.[7] .............................. H04N 1/409; G06T 5/00
(52) U.S. Cl. ..................... 358/2.99; 358/3.01; 358/3.23; 358/3.27; 382/205; 382/269
(58) Field of Search ......................... 358/1.9, 1.2, 3.26, 358/3.27, 3.01, 2.1, 2.99, 3.23, 533, 447; 382/205, 199, 254, 266, 269; 345/611, 613

(56) References Cited

U.S. PATENT DOCUMENTS

| | | | |
|---|---|---|---|
| 5,339,171 A | * 8/1994 | Fujisawa et al. | ............ 358/3.03 |
| 5,450,208 A | * 9/1995 | Murata | ......................... 358/296 |
| 5,760,921 A | * 6/1998 | Miyake | ....................... 358/3.07 |
| 2001/0021035 A1 | * 9/2001 | Takashimizu | ................ 358/1.9 |

FOREIGN PATENT DOCUMENTS

JP          9-270911          10/1997

* cited by examiner

Primary Examiner—Scott Rogers
(74) Attorney, Agent, or Firm—Westerman, Hattori, Daniels & Adrian, LLP

(57) ABSTRACT

Discloses an image formation apparatus capable of achieving a picture quality improvement of a multi-value image without increasing the size of a look-up table to a size larger than the size of a look-up table that is used for the picture quality improvement at the time of forming two-value image data. The image formation apparatus can form an image having at least one density in addition to two values of white and black in pixel units, and includes a density separation section that distributes a multi-value image data to a plurality of density planes according to a predetermined rule, a correction signal generator that outputs correction signals for correcting the layout of pixels in each of the plurality of density planes, and a correction signal combiner that combines the correction signals output from the density planes according to a predetermined combining rule.

6 Claims, 12 Drawing Sheets

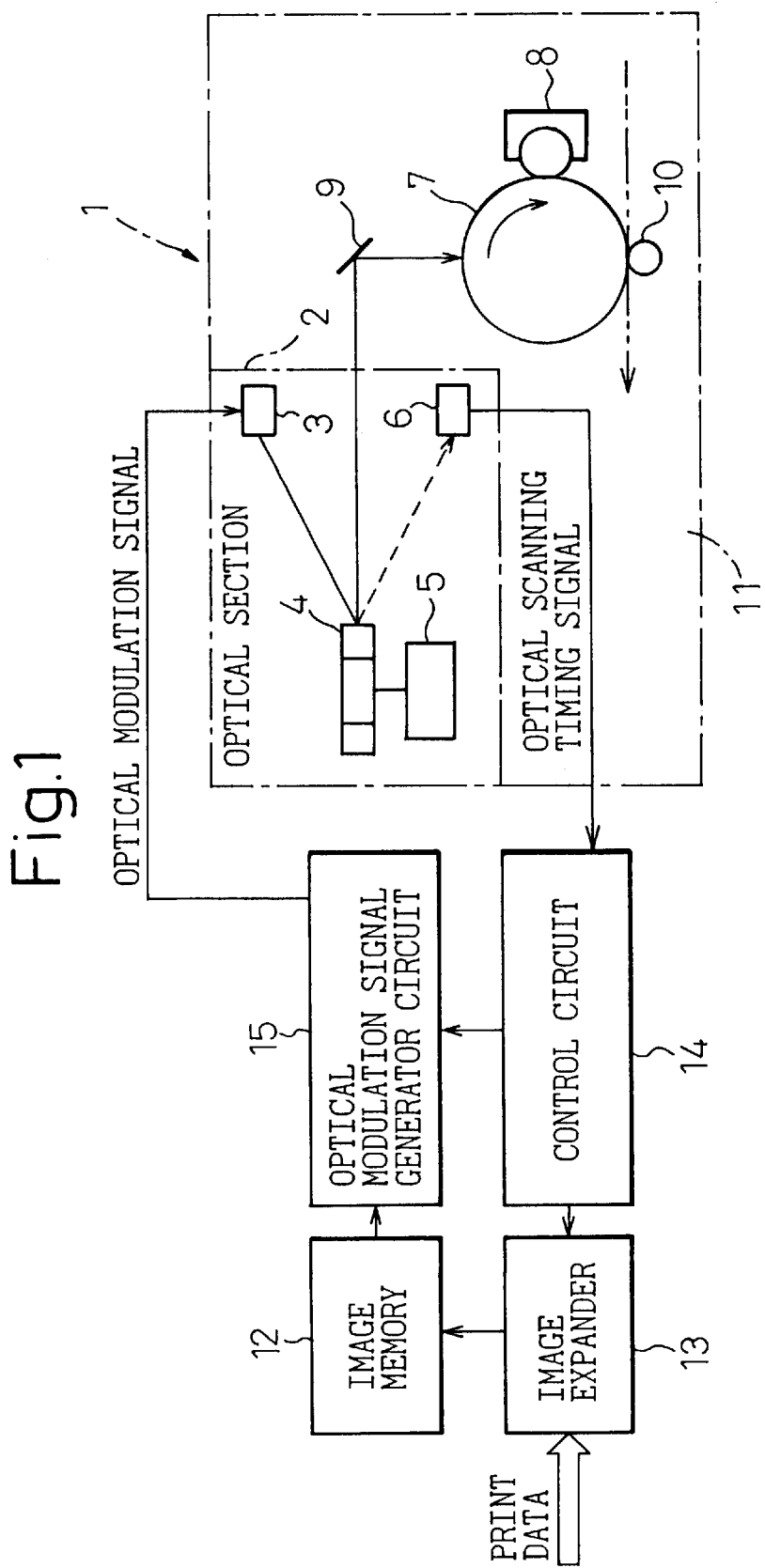

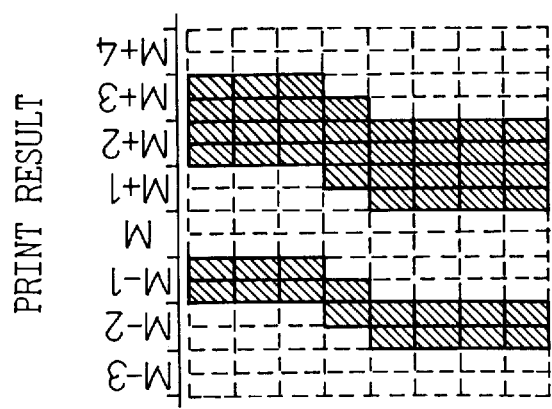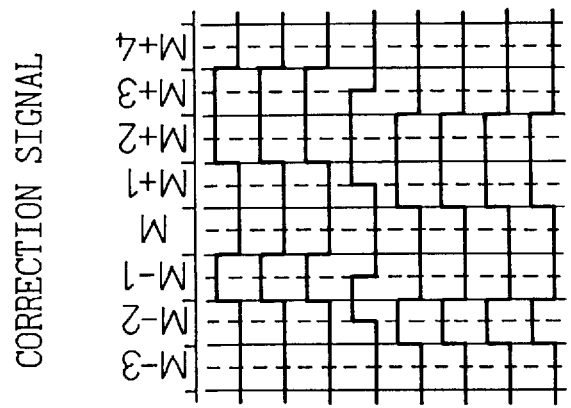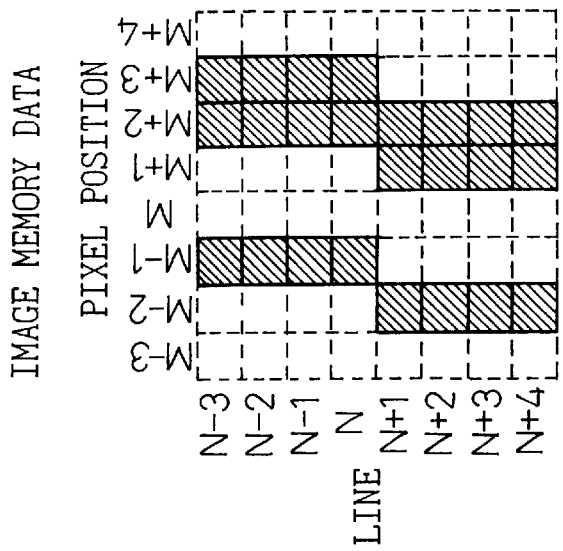

FOCUSED PIXEL (N, M-1)

CORRECTION DATA

FOCUSED PIXEL (N, M+1)

CORRECTION DATA

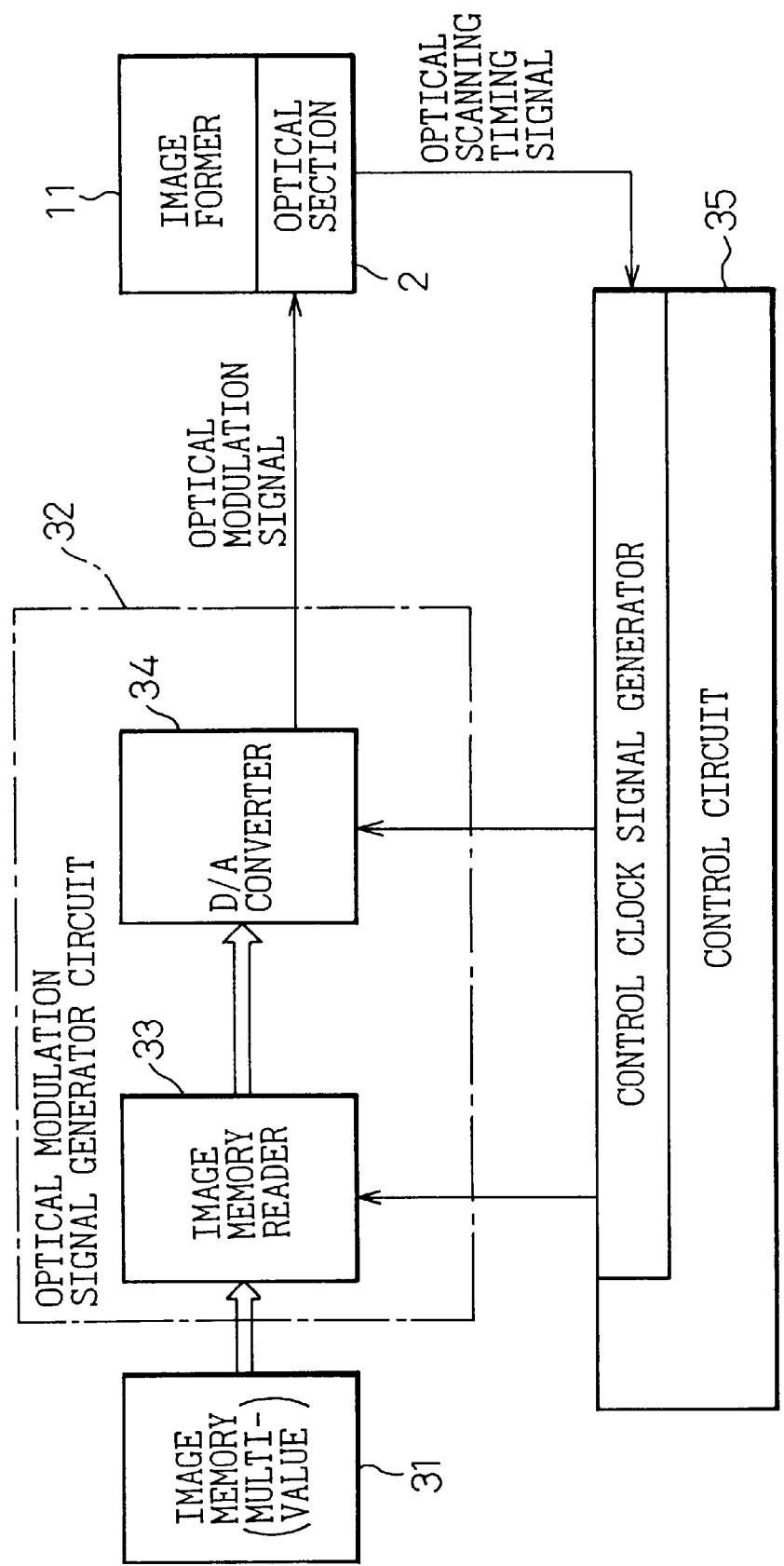

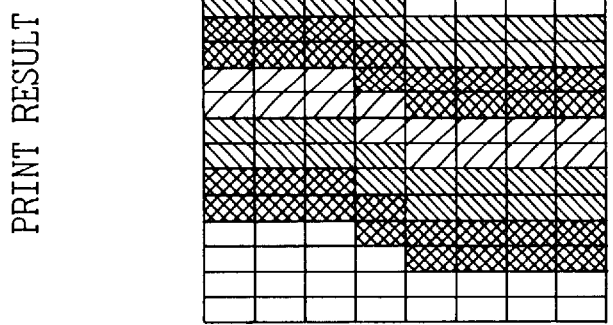
Fig.6A IMAGE DATA MEMORY
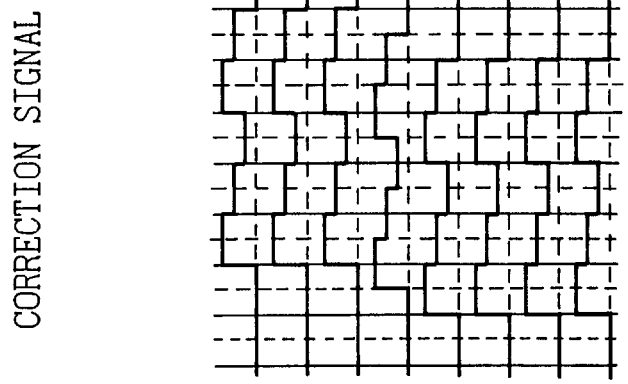
Fig.6B CORRECTION SIGNAL
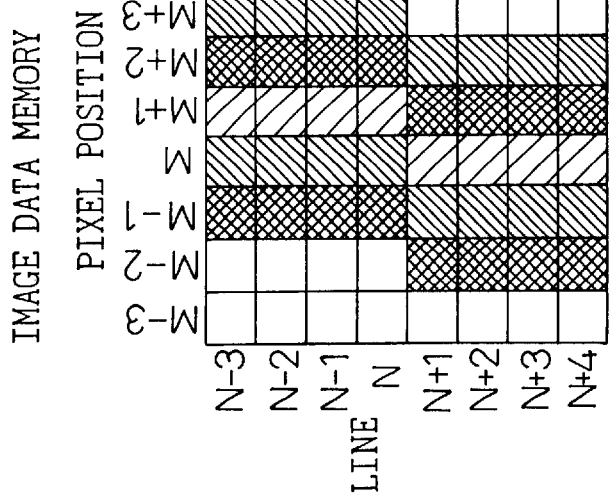
Fig.6C PRINT RESULT

Fig.8

A DISTRIBUTION RULE FOR DISTRIBUTING MULTI-VALUE IMAGE
DATA TO DENSITY PLANES ACCORDING TO THE FIRST EMBODIMENT

| DATA READ FROM THE MEMORY (DENSITY SEPARATION INPUT) | 3 | 2 | 1 | 0 |
|---|---|---|---|---|
| DENSITY SEPARATION OUTPUT: PLANE 1 | 0 | 0 | 1 | 0 |
| DENSITY SEPARATION OUTPUT: PLANE 2 | 0 | 1 | 0 | 0 |
| DENSITY SEPARATION OUTPUT: PLANE 3 | 1 | 0 | 0 | 0 |

Fig.9

A COMBINING RULE ACCORDING TO THE FIRST EMBODIMENT

| PLANE-1 CORRECTOR OUTPUT | X | X | 1 | 0 |
|---|---|---|---|---|
| PLANE-2 CORRECTOR OUTPUT | X | 1 | 0 | 0 |
| PLANE-3 CORRECTOR OUTPUT | 1 | 0 | 0 | 0 |
| CORRECTION SIGNAL COMBINER OUTPUT | 3 | 2 | 1 | 0 |

Fig.11

| DATA READ FROM THE MEMORY (DENSITY SEPARATION INPUT) | 3 | 2 | 1 | 0 |
|---|---|---|---|---|
| DENSITY SEPARATION OUTPUT: PLANE 1 | 1 | 1 | 1 | 0 |
| DENSITY SEPARATION OUTPUT: PLANE 2 | 1 | 1 | 0 | 0 |
| DENSITY SEPARATION OUTPUT: PLANE 3 | 1 | 0 | 0 | 0 |

IMAGE FORMATION APPARATUS AND IMAGE FORMATION METHOD

BACKGROUND OF THE INVENTION

1. Field of the Invention

The present invention relates to an image formation apparatus that is used as an output unit for outputting multi-value image data that has been generated by a computer or the like. Particularly, the invention relates to an antialiasing technique for improving the picture quality that makes it possible to decrease the zigzag effect of a jaggy (a zigzag of pixels (dots)) that is generated in the image formation of characters or line drawings. The present invention can be applied to any kind of device that can form an image of at least one density in addition to the two values of black and white in pixel units. Examples of the application of the present invention to a printer, particularly, a laser printer, will be explained.

2. Description of Related Art

FIG. 1 is a diagram that shows an example of a structure of a laser beam printer.

A reference number 1 denotes a main body of a laser beam printer. The main body has an optical section 2 and an image formation section 11. The optical section 2 includes a laser 3 that outputs a laser beam, a polygon mirror 4 that deflects a laser beam so as to repetitively scan the laser beam, a mirror motor 5 that rotationally drives the polygon mirror 4, and a beam detector 6 that detects a start of the scanning of a laser beam. The image formation section 11 includes a photosensitive drum 7, a developer 8, a transfer roller 10, and a return mirror 9. The surface of the photosensitive drum 7 is charged with an electric charge, not shown. Thereafter, the photosensitive drum 7 receives a laser beam on this surface. A laser beam signal from the laser 3 is modulated in synchronism with the scanning of the laser beam and the rotation of the photosensitive drum 7. Then, an optical image corresponding to an image to be printed is drawn on the surface of the photosensitive drum 7. Static electricity charged onto the surface of the photosensitive drum 7 decreases according to the intensity of the laser beam, so that a static latent image is formed on the surface. When a charged toner is contacted to the surface of the photosensitive drum 7 by the developer 8, the toner adheres to the surface of the photosensitive drum 7 according to the static latent image so that an image is formed. A sheet of paper is brought into contact with the surface of the photosensitive drum on which the toner image has been formed. The transfer roller 10 rolls the sheet on the surface of the photosensitive drum to transfer the toner image onto the paper. A fixer not shown then fixes the transferred toner image onto the paper. As a result, the printing of the image onto the paper has been completed. After the transfer of the toner image, the surface of the photosensitive drum is cleaned. The surface of the photosensitive drum is charged with an electric charge again, and the above process is repeated.

The print data that has been input from a computer system is expanded as a print image data and is stored in an image memory 12 by an image expander 13. In general, the image memory 12 is called a bit map memory. In the case of two-value print data, each bit of the bit map memory, that is, one bit, corresponds to a print pixel. In the case of a multi-value print data, a few bits of the bit map memory correspond to a print pixel. For example, in the case of a four-bit print data, the bit map memory also has a four-bit structure. Based on the four-bit print data, it is possible to express 16 gradations in pixel units. An optical modulation signal generator circuit 15 reads out the image data stored in the image memory 12 in synchronism with the processing of the main body, and generates an optical modulation signal and applies it to the laser 3.

In the single-color two-value printers such as monochromatic laser printers, there has been partly employed a picture-quality improvement processing (a smoothing processing). According to this method, a jaggy that has been generated in the printing of characters and line drawings is automatically judged from the print bit map data expanded on the image memory. The jaggy is then converted into a data of higher resolution than that of the input image data, thereby to decrease the zigzag effect of the jaggy.

FIG. 2A to FIG. 2C are diagrams for explaining an example of the smoothing processing of the two-value image data. As shown in FIG. 2A, it is assumed, for example, that there are vertical lines each of which is deviated by one pixel (dot) position in the middle of the line in the print image data stored in the image memory 12. This deviation is a jaggy. In the smoothing processing, the existence of a jaggy is decided based on a matching of patterns of pixel data including neighboring pixels. At the jaggy pixel positions of the lines, the output timing of the optical modulation signal is adjusted as shown in FIG. 2B. The image is printed after this adjustment. As shown in FIG. 2C, the jaggy portions of the vertical lines are smoothed by decreasing the size of the deviation by a half dot. The above shows an example of a smoothing adjustment carried out based on a half-dot adjustment in the same direction. However, it is also possible to adjust the dots in any direction of left and right. In other words, the smoothing processing is an addition or a deletion of dots at jaggy portions to make it possible to print an image by increasing the resolution of the original image data by an integer times in the main scanning direction of the laser beam.

FIG. 3 shows one example of a structure of a picture quality improvement circuit that carries out a smoothing processing of a two-value print data. As shown in FIG. 3, an optical modulation signal generator circuit 15 has an image memory reader 16 and a picture quality improvement circuit 17. Further, the picture quality improvement circuit 17 has a line buffer 18, an evaluation window extractor 21, and a correction signal generator 22.

The image memory reader 16 reads out from an image memory 12 bit map data that is located a few lines before the print data currently under exposure by the laser 3, and transfers the read-out data to the line buffer 18. The line buffer 18 consists of a shift register which holds data of a few lines before and after the print data currently under exposure.

The evaluation window extractor 21 extracts data of a rectangular area (this area is called an "evaluation window") 19 around one focused pixel (this pixel is called a "focused pixel (dot)") in the data that is being held in the line buffer 18. Then, the evaluation window extractor 21 outputs an extracted-pattern layout signal that expresses a pixel layout in the rectangular area. This extracted-pattern layout signal is input to a correction signal generator circuit 22. The correction signal generator circuit 22 is a circuit that generates a correction signal for a focused pixel based on a dot layout within the evaluation window shown by the extracted-pattern layout signal. The correction signal generator circuit 22 has a look-up table that stores a neighboring pattern of the focused pixel. The correction signal generator circuit 22 correlates the input extracted-pattern layout signal with the look-up table, and outputs a correction signal that has been stored based on this correlation. For example, when it is not necessary to correct the focused pixel, the correction signal generator circuit 22 generates a modulation signal based on the original pixel data, and outputs this modulation signal as a correction signal. When it is necessary to correct the focused pixel, the correction signal generator circuit 22 generates a correction signal based on a correction data stored in advance, and outputs this correction signal.

FIG. 4A to FIG. 4D are diagrams for explaining the smoothing processing of the dot layout pattern of the image data shown in FIG. 2A to FIG. 2C. FIG. 4A shows a pattern of an extracted rectangular area that has been extracted in the size of 5 times 5 pixels around a "focused pixel" including this "focused pixel" which is located at a position of a line=N and a pixel=M−1. When it has been judged that the pattern stored in the look-up table coincides with the pattern of the extracted square area, a decision is made that it is necessary to correct the pixel which is located at the position of the line=N and the pixel=M−1. As a result, a correction data as shown in FIG. 4B is output. An optical modulation signal is then generated based on this correction data. As explained below, correction data is also generated for the pixel located at a position of the line=N and a pixel M−2, and an optical modulation signal is generated based on this correction data.

FIG. 4C shows a pattern of an extracted square area that has been extracted in the size of 5 times 5 pixels around a "focused pixel" including this "focused pixel" which is located at a position of a line=N and a pixel=M+1. When it has been judged that the pattern stored in the look-up table coincides with the pattern of the extracted rectangular area, a correction data as shown in FIG. 4D is output as a correction data at a position of the line=N and the pixel=M+1. Based on this, an optical modulation signal is generated.

The picture quality improvement circuit shown in FIG. 3 sequentially moves in synchronism with a pixel printing timing of the "focused pixel" in the main body 1. The picture quality improvement circuit then outputs an optical modulation signal at a position of the "focused pixel" at the time of actually printing the pixel at the position corresponding to the "focused pixel". A control clock signal generator 23 within a control circuit 14 generates a control clock for controlling the operation timing of the picture quality improvement circuit.

The above explains the case that a pixel is corrected by increasing the resolution of the pixel by two times in the main scanning direction. When a pixel is to be corrected by increasing the resolution of the pixel by three times, a similar operation is conducted. In the present specification, in order to simplify the explanation, there will be explained only the case where a pixel is corrected by increasing the resolution of the pixel by two times in the main scanning direction.

There have also been provided multi-value printers that can express pixels in the intermediate densities in print pixel units by using multi-values in addition to the two values of white and black. For example, according to the laser beam printer as shown in FIG. 1, the light-emitting quantity or the light-emitting time of the laser 3 of the optical section is controlled to change the size of print pixels formed by the image formation section, thereby to equivalently change the densities of the print pixels.

FIG. 5 is a diagram showing one example of a structure of a laser beam printer that carries out a multi-value printing in print pixel units by changing the light-emitting quantity of the laser. In FIG. 5, the laser beam printer has a main body and a control circuit that have substantially the same structure as those of the main body 1 and the control circuit 14 shown in FIG. 1. Multi-value print bit map data having density gradations expanded to an image memory 31. An image memory reader 33 reads out a pixel data from the image memory 31 in synchronism with a pixel printing timing in the image formation section. A D/A converter 34 converts the pixel data read out from the image memory 31 into an optical modulation signal having an analog intensity corresponding to the multi-value data according to the density values of the pixel data.

A smoothing processing is also carried out in the laser beam printer that conducts a multi-value printing. FIG. 6A to FIG. 6C are diagrams showing an example of a smoothing processing of four-value image data. FIG. 6A shows one example of a pattern of four-value bit map data on the image data memory. FIG. 6B shows an optical modulation signal at the time of multi-value printing an image in print pixel units by changing the light-emitting quantity of the laser. FIG. 6C shows a print result.

For carrying out a smoothing processing of multi-values shown in FIG. 6A to FIG. 6C, a picture quality improvement circuit that has a similar structure to that shown in FIG. 3 is also used. The only difference is that the picture quality improvement circuit in this case processes the multi-value data as pixel data. Therefore, for this purpose, it is necessary that the line buffer 18 can store multi-value data, that the evaluation window extractor 21 can extract an extracted-pattern layout signal of the multi-value data and can transfer this signal to the correction signal generator 22, and that the correction signal generator 22 has a multi-value look-up table. However, when the number of densities including white that can be expressed in print pixel units is C, the number of combinations of patterns that are extracted as evaluation windows becomes $(C/2)^{25}$ times the number of combinations in the case of the two-value data Further, the size of the look-up table becomes D times in order to express the C densities of the output of the correction signal. This D is an integer that meets the condition of $2^{D-1}<C \leq 2^D$.

For example, when the number of idensities including white that can be expressed in the print pixel units is four, the size of the look-up table becomes $(4/2)^{25} \times 2 = 67,108,864$ times the number of densities in the case of the two-value data. In this case, the number of combinations that are input to the look-up table is the number of combinations of the patterns that are extracted as evaluation windows. This number becomes 35,554,432 times the number of combinations of the patterns in the case of the two-value data.

As explained above, when the picture quality improvement circuit of the conventional technique is directly applied to the picture quality improvement (smoothing) of a multi-value image in the multi-value printer, the necessary size of the look-up table becomes enormously large. This has a problem that the preparation of the table data becomes very complex because the table data needs to be the combination of the pixel layout and the pixel densities, which is not practicable.

SUMMARY OF THE INVENTION

It is an object of the present invention to provide an image formation apparatus capable of achieving a picture quality improvement of a multi-value image without increasing the required size of a look-up table to a size larger than the size of a look-up table that is used for the picture quality improvement at the time of forming two-value image data.

In order to achieve the above object, according to the present invention, there is provided an image formation apparatus which distributes an input multi-value image data to a plurality of density planes based on a predetermined distribution rule according to densities that can be expressed in pixel units, carries out a picture quality improvement processing for each density plane, outputs correction signals produced as a result of the picture quality improvement processing for each density plane, and combines these correction signals according to a predetermined combining rule, thereby to correct the layout of the pixels.

In other words, the image formation apparatus of the present invention is an image formation apparatus that can form an image of at least one density in addition to two values of white and black in pixel units, the image formation apparatus comprising: a density separation section that distributes a multi-value image data to a plurality of density planes according to a predetermined rule; a correction signal generator that outputs correction signals for correcting the layout of pixels in each of the plurality of density planes; and a correction signal combiner that combines correction signals output from the density planes according to a predetermined combining rule.

When the number of gradations that can be expressed in pixel units is C, for example, it is preferable that the number of the plurality of density planes of the density separation section is C-1. However, the number may be smaller than this so long as the number is a plural number.

According to a first aspect of the present invention, the density separation section distributes a multi-value image data to a plurality of density planes according to a distribution rule for distributing the multi-value image data based on gradations that can be expressed in pixel units. According to a second aspect of the invention, the density separation section distributes the multi-value image data to a plurality of density planes according to a distribution rule for distributing the multi-value image data based on threshold values of gradations that can be expressed in pixel units.

When there are a plurality of density planes for the same pixel, the correction signal combiner combines correction signals according to a combining rule of selecting and outputting a correction signal that is output from the density plane having the highest density. This means the following cases when there are a plurality of density planes for a certain pixel. If for example, a correction has not been carried out in the density plane of the highest density, and the original pixel data has been converted into a correction signal without correction, the original pixel data is output as it is as an optical modulation signal even if a correction has been carried out in other density plane of which density is lower than that of this original pixel data. On the other hand, if a correction has been carried out in a high-density plane, an image is formed according to a correction signal of this high-density plane, even if a correction has not been carried out in other lower-density plane. The correction signals are combined in pixel units.

According to the present invention, the image data distributed to each density plane can be handled as a two-value image data. It is, therefore, possible to achieve the picture quality improvement of a multi-value image in the apparatus by directly using the look-up table that is used for picture quality improvement at the time of forming two-value data.

In order to achieve the above picture quality improvement (smoothing processing), it is necessary that the printer can form a multi-value image at a resolution an integer times the resolution of the pixels of the input image, in at least one direction, that is, in the main scanning direction in the case of a laser beam printer. In other words, each pixel of the image data consists of several apparatus pixels, in at least one direction.

With a suitable pixel of an image to be formed selected as a focused pixel, there is used an evaluation window extractor that extracts a predetermined area covering this focused pixel together with its neighboring pixels and that outputs extracted-pattern layout signals for expressing pixel layout positions of density planes. The correction signal generator generates correction signals based on the extracted-pattern layout signals.

Therefore, each density plane may have a capacity capable of expanding a predetermined area covering the focused area and its neighboring pixels within a minimum evaluation window. There may be also provided a data memory as an option that temporality stores data of the plurality of density planes distributed by the density separation section. In this case, the data memory may have a capacity capable of temporarily storing a few lines of bit map data of the image memory.

In any case, each of the plurality of density planes may have a small memory capacity that can temporarily store either a predetermined area covering the focused area that is a pixel corresponding to a pixel position in the image to be formed and its neighboring pixels or a few lines of data including the focused pixel.

BRIEF DESCRIPTION OF THE DRAWINGS

The features and advantages of the invention will be more clearly understood from the following description taken in conjunction with the accompanying drawings in which:

FIG. 1 is a diagram showing an example of a structure of a laser printer;

FIG. 2A to FIG. 2C are diagrams showing an example of a smoothing processing of a two-value image;

FIG. 5 is a diagram showing an example of a multivalue image data converter circuit for a laser beam printer;

FIG. 6A to FIG. 6C are diagrams showing an example of a structure of a prior-art picture quality improvement (a smoothing processing) circuit for a multi-value image;

FIG. 8 is a diagram showing a logic of a distribution rule for distributing multi-value image data to density planes according to the first embodiment;

FIG. 9 is a diagram showing a logic of a combining rule for combining the outputs of density planes according to the first embodiment;

FIG. 11 is a diagram showing a logic of a distribution rule for distributing multi-value image data to density planes according to a second embodiment of the present invention;

DESCRIPTION OF THE PREFERRED EMBODIMENTS

Figure 7:
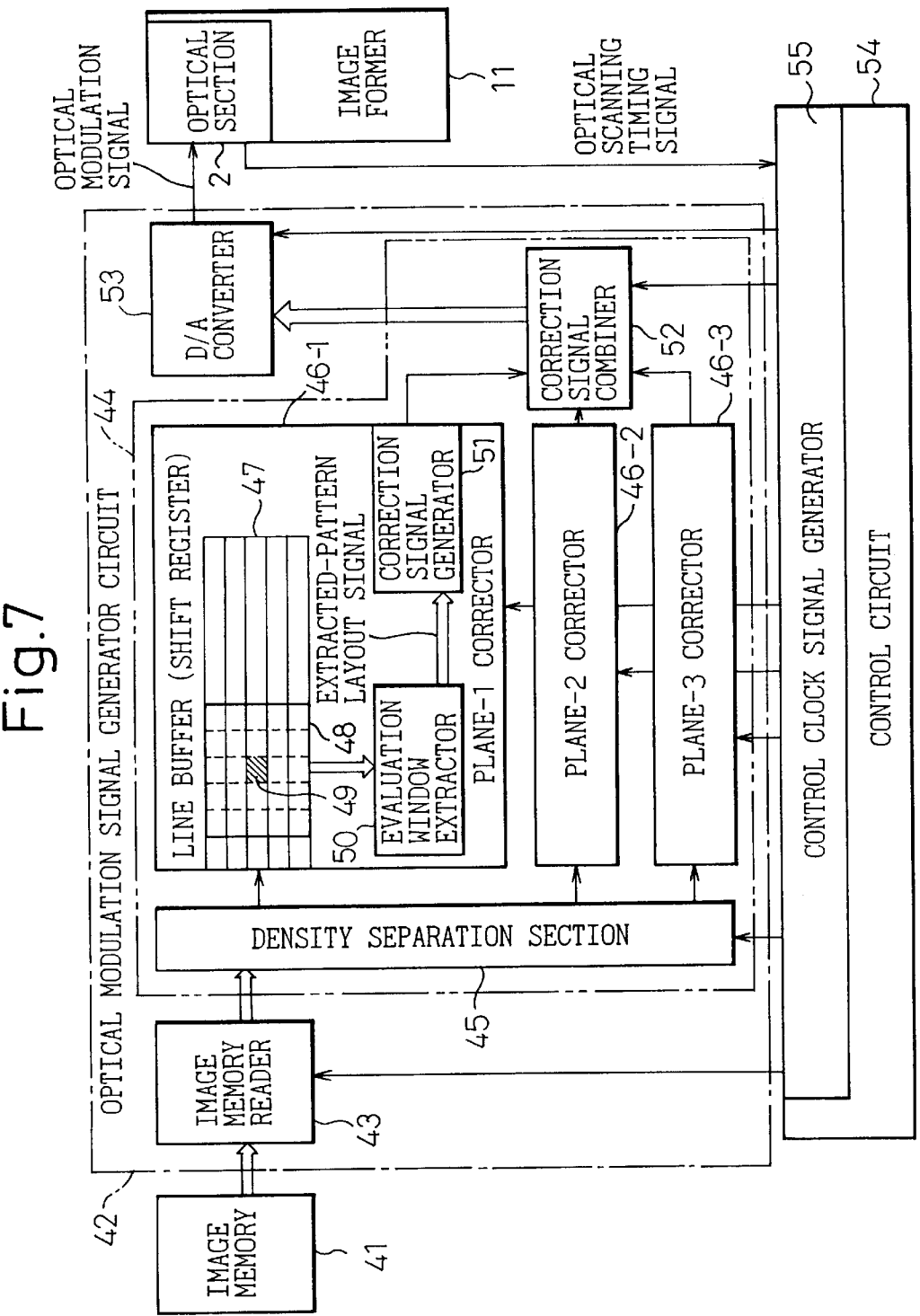
FIG. 7 is a diagram showing a structure of a printer according to a first embodiment of the present invention.

FIG. 7 is a diagram showing a structure of a printer equipped with an optical modulation signal generator circuit 42 including a picture quality improvement circuit according to a first embodiment of the present invention. The printer of the first embodiment is a laser beam printer capable of printing an image in four gradations including white and black in print pixel units. The printer has an optical section 2 of a printer main body and an image formation section 11 each having a similar structure to that of the corresponding section in FIG. 1. An image memory 41 is a two-bit bit map memory. An image is expanded to the image memory 41 in advance in a printable state by an image expander. As three gradations can be expressed excluding white in print pixel units, three density planes are prepared in advance. In this example, the densities of the print pixels are expressed by 0 to 3, with a larger value showing a higher density (black). The density 0 corresponds to white and the density 3 corresponds to black.

A control clock signal generator 55 of a control circuit 54 generates a plurality of control clock signals based on an optical scanning timing signal that is output from an optical section 2. Based on the plurality of control clock signals, an optical modulation signal generator circuit 42 outputs an optical modulation signal in synchronism with the progress of an image writing in the main body.

An image memory reader 43 reads out a multi-value pixel data from the image memory 41, and sends this pixel data to a density separation section 45. The density separation section 45 distributes a two-valued pixel data to a plane-1 corrector 46-1 to a plane-3 corrector 46-3 according to a predetermined distribution rule based on the densities of the pixels. The distribution rule in the density separation section will be explained later.

Figure 3:
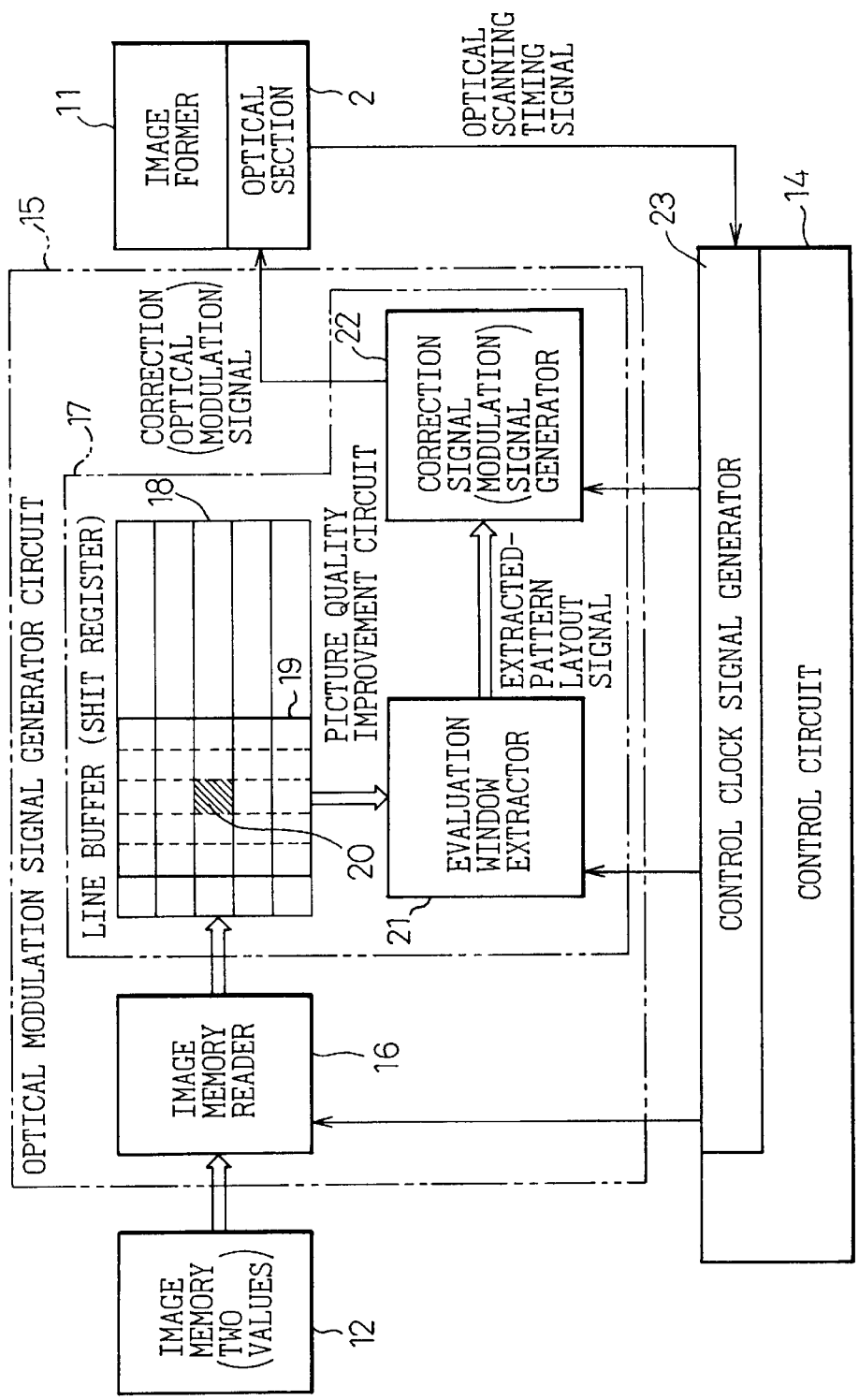
FIG. 3 is a diagram showing an example of a structure of a prior-art picture quality improvement (smoothing processing) circuit for a two-value image.
Figure 4A:
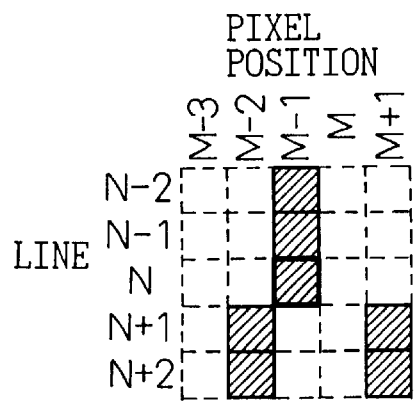
FIG. 4A to FIG. 4D are diagrams showing examples of a smoothing processing.
Figure 4B:
Figure 4C:
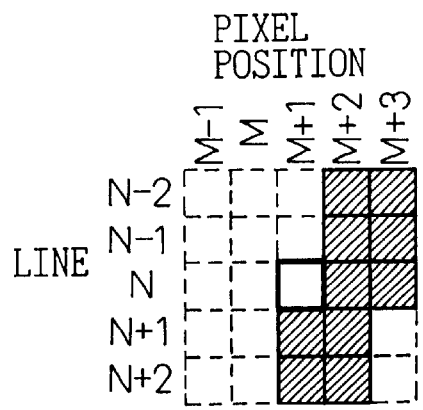
Figure 4D:

Each of the plane-1 corrector 46-1 to the plane-3 corrector 46-3 carries out a picture quality improvement processing to each input pixel data, and outputs a result of the processing as a correction signal of each level. As the two-valued pixel data has been input to each plane corrector, the corrector can apply the correction rule based on the same structure as that of the conventional monochromatic two-value printer. In other words, the circuitry shown in FIG. 3 can be used as it is.

The correction signals output from the respective plane correctors are combined together by a correction signal combiner 52 according to a predetermined combining rule, and a result of the combination of the correction signals is sent to a D/A converter 53. The combining rule in the correction signal combiner 52 will be explained later. An output signal from the D/A converter 53 is applied to the laser of the optical section 2 as an optical modulation signal.

The distribution rule of the density separation section according to the first embodiment will be explained next. According to the distribution rule of the first embodiment, images of pixels on the image memory are separated into images by pixel densities and are distributed to planes by pixel densities. FIG. 8 shows a logic of the distribution rule of the first embodiment. According to this rule, images of the density 1 within the image memory are distributed to a plane 1, images of the density 2 are distributed to a plane 2, and images of the density 3 are distributed to a plane 3, respectively.

The combining rule in the correction signal combiner 52 according to the first embodiment will be explained next.

FIG. 9 is a diagram showing a logic of the combining rule of the first embodiment. According to this combining rule, when there is a plane of which density is not zero for the same print pixel, a correction signal of the plane having a highest density is output with priority.

For example, when the density of a certain pixel is 3, this pixel data is distributed to the plane-3 corrector 46-3. The densities of the pixels of other planes 1 and 2 are 0. However, there is a case where there occurs a correction data in this pixel as a result of a correction carried out in relation to neighboring pixels. This occurs in the case of printing only a one-half pixel. As the correction signal has been output to the plane 3, the priority is placed on the correction output to the plane 3. Even if a correction output has occurred in the plane 1 or plane 2, this output is disregarded. The combining of the correction signals is carried out in print pixels.

Figure 10:
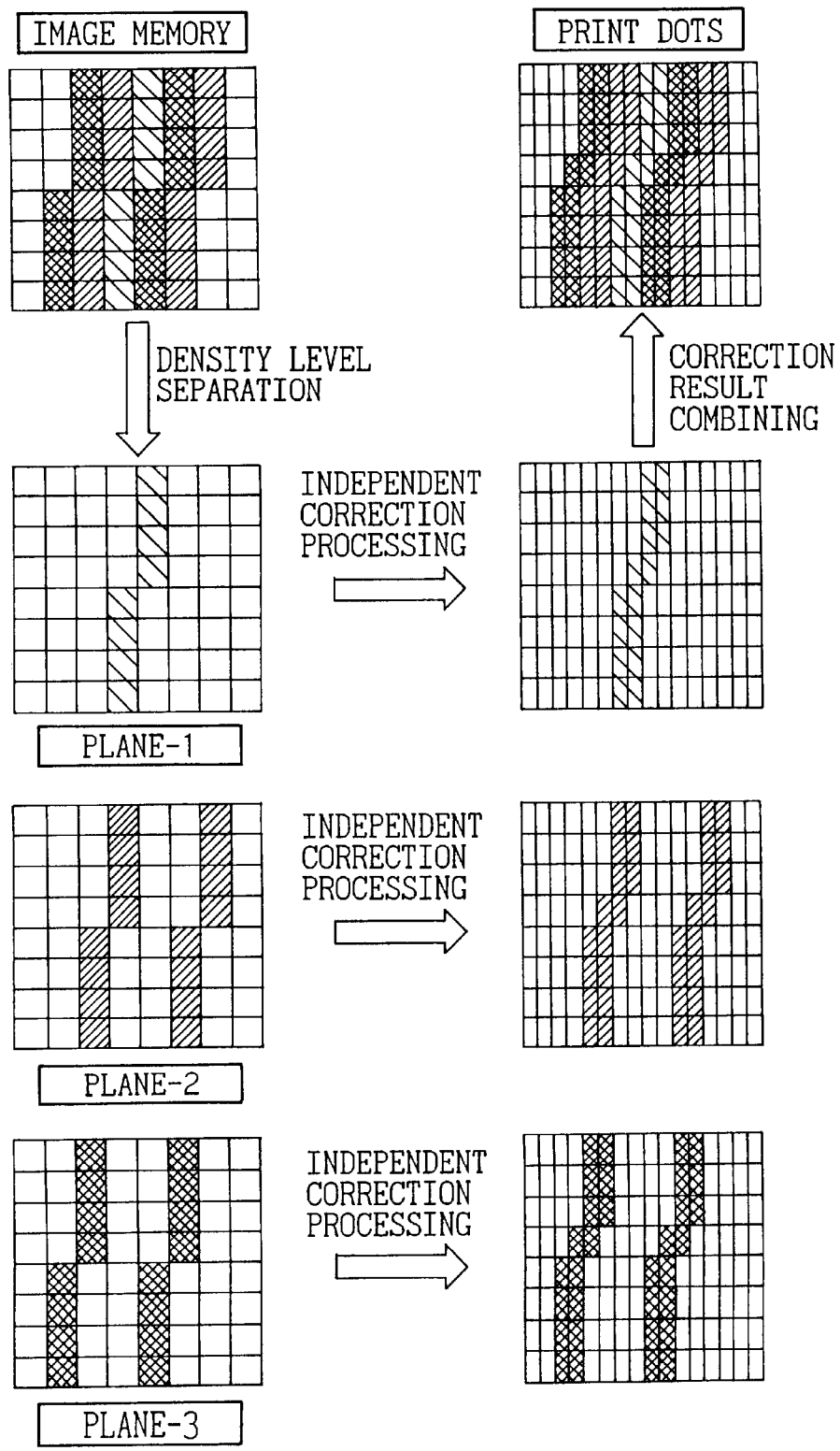
FIG. 10 is a diagram showing picture quality improvement processing according to the first embodiment.

FIG. 10 is a diagram that shows an example of the smoothing processing according to the first embodiment. The image includes a pattern of vertical lines having a jaggy in the middle portion. Between two thick vertical lines (the density 3), there are two low-density vertical lines (density 1 and density 2). On the right side of each thick line (density 3), the line of density 2 is located. The pixel layout as shown is expanded onto the bit map memory of the image memory 41. This pattern is distributed to the planes 1 to 3 as shown in FIG. 10. In each plane, an independent smoothing processing is carried out, and an independent correction output is obtained. These three correction outputs are combined together according to the combining rule shown in FIG. 9. As a result, a print result shown on the right top in FIG. 10 is obtained.

FIG. 11 shows a logic of the distribution rule according to a second embodiment of the present invention. The second embodiment is the same as the first embodiment except the distribution rule. According to the distribution rule of the second embodiment, images of pixels within the image memory 41 are separated by pixel densities based on each print pixel density as a slice level. Specifically, as shown in FIG. 11, pixel images of the density 1 and above within the image memory 41 are distributed to the plane 1, images of the density 2 and above are distributed to the plane 2, and images of the density 3 are distributed to the plane 3.

The corrector of each plane carries out an independent smoothing operation for each distributed image, and produces an independent correction output, in a similar manner to that of the first embodiment. Assume there is a plane in which the pixel density is not zero for the same print pixel. In this case, the correction signal combiner outputs a correction signal of the plane that has a highest density, with the priority placed on this correction signal, in a similar manner to that of the first embodiment.

Figure 12:
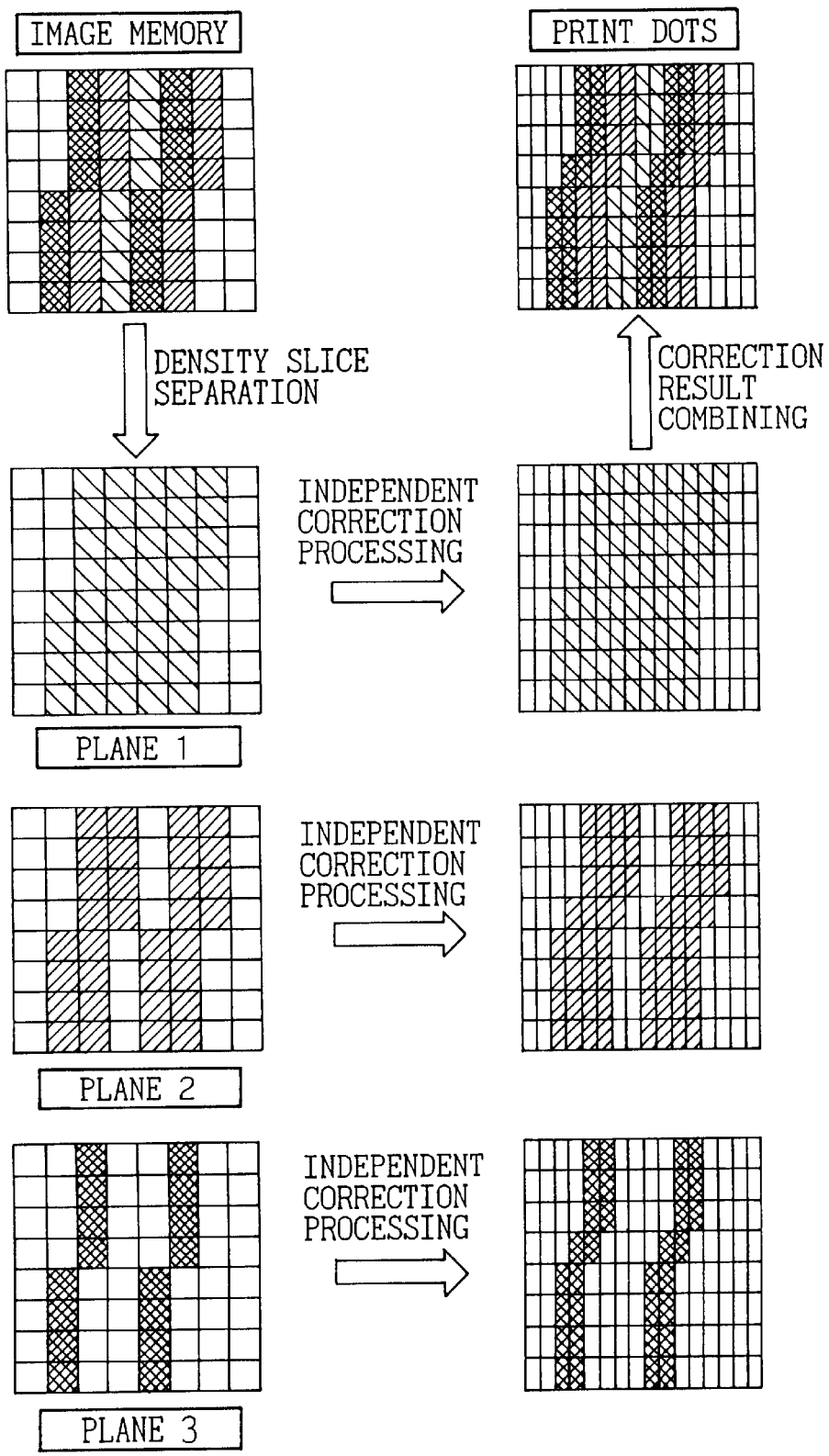
FIG. 12 is a diagram showing an example of a picture quality improvement processing according to the second embodiment.

FIG. 12 shows an example of the smoothing processing according to the second embodiment. This pattern is the same as that shown in FIG. 10. This pattern is distributed to the planes 1 to 3 according to the distribution rule shown in FIG. 11. In each plane, an independent smoothing processing is carried out, and an independent correction output is obtained. These three correction outputs are combined together according to the combining rule shown in FIG. 9. As a result, a print result as shown on the right top in FIG. 12 is obtained.

Figure 13:
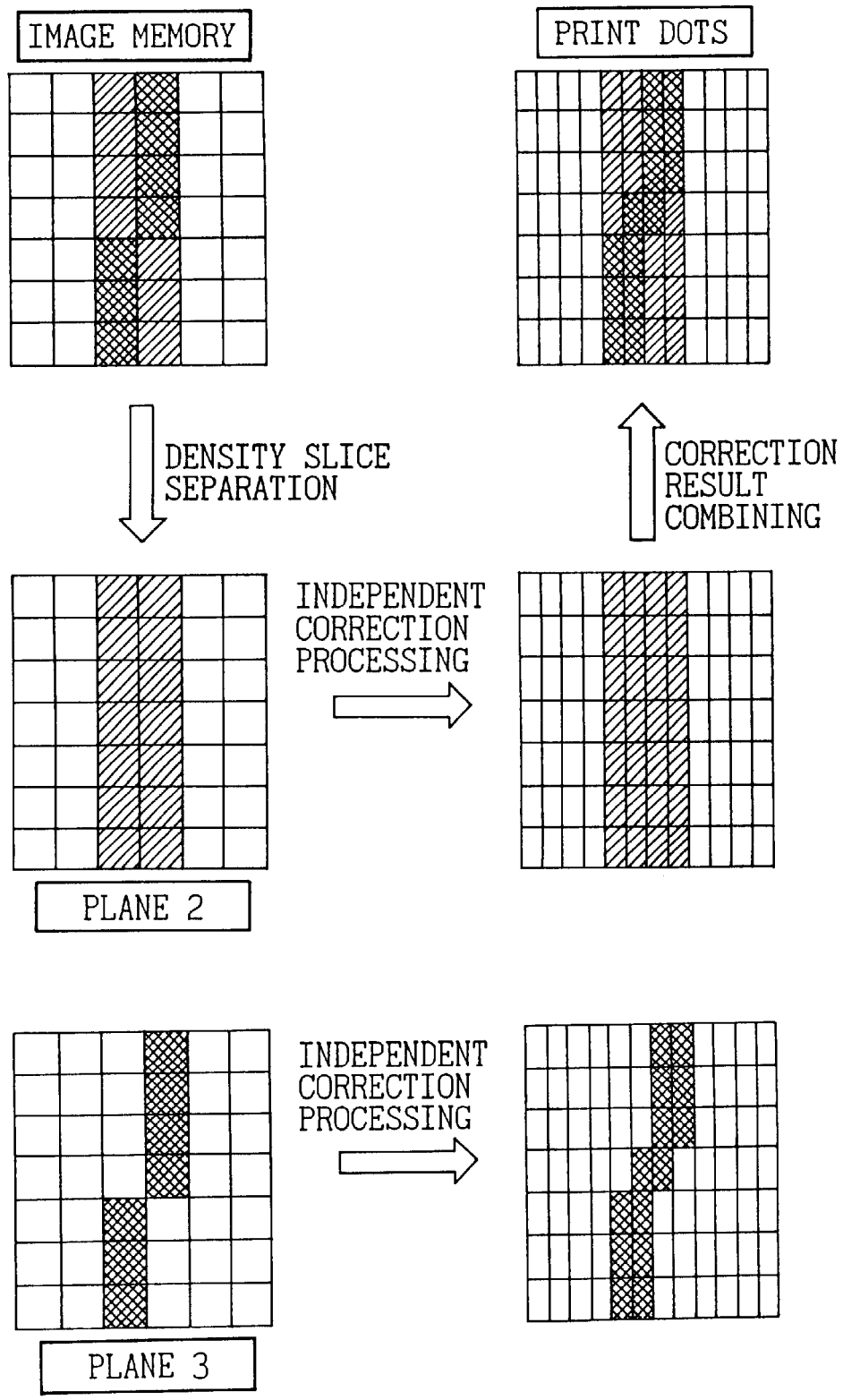
FIG. 13 is a diagram showing another example of a picture quality improvement processing according to the second embodiment.

FIG. 13 is a diagram that shows another processing example of the second embodiment. This pattern shows two vertical lines of densities 2 and 3 that cross in the middle of the lines. This pattern is distributed to the plane 2 and the plane 3 as shown according to the distribution rule shown in FIG. 11. In the plane 2, the vertical lines have no jaggy. In this case, a correction signal is output based on the original data as it is. In the plane 3, the vertical line has a jaggy. In this case, a smoothing processing as shown is carried out. When the two independent output results are combined together according to the combining rule shown in FIG. 9, a print result as shown on the right top in FIG. 13 is obtained.

It has been explained in the above that the image memory has a capacity corresponding to the number of bits that express the pixels of the image data. However, the image memory may also have density planes corresponding to the number of gradations that can be printed. In this case, the capacity of the image memory increases.

As explained above, according to the present invention, in an image forming apparatus that forms a multi-value image, it is possible to implement a picture quality improvement for decreasing the zigzag effect of a jaggy that occurs at the time of forming the image, without increasing the required size of a look-up table to a size larger than the size of a look-up table used for forming two-value image data. In other words, it is possible to achieve a picture quality improvement (a smoothing processing) in forming a multi-value image, at low cost and with a simple structure.

What is claimed is:

1. An image formation apparatus that can form an image of at least one density in addition to two values of white and black in pixel units, the image formation apparatus comprising:

a density separation that distributes a multi-value image data to a plurality of density planes according to a predetermined rule;

a correction signal generator that outputs correction signals for correcting the layout of pixels in each of the plurality of density planes; and a correction signal combiner that combines the correction signals output from the density planes according to a predetermined combining rule.

2. An image formation apparatus according to claim 1, wherein when the number of gradations that can be expressed in pixel units is C, the number of the plurality of density planes of the density separation section is C−1.

3. An image formation apparatus according to claim 1, wherein the density separation section distributes the multi-value image data to a plurality of density planes according to a distribution rule for distributing the multi-value image data based on gradations that can be expressed in pixel units.

4. An image formation apparatus according to claim 1, wherein the density separation section distributes the multi-value image data to a plurality of density planes according to a distribution rule for distributing the multi-value image data based on threshold values of gradations that can be expressed in pixel units.

5. An image formation apparatus according to any one of claims 1 to 4, wherein when there are a plurality of density planes for the same pixel, the correction signal combiner combines the correction signals according to a combining rule of selecting and outputting a correction signal that is output from the density plane having the highest density.

6. An image formation method that can form an image of at least one density in addition to two values of white and black in pixel units, the image formation method comprising the steps of:

distributing a multi-value image data to a plurality of density planes according to a predetermined rule;

outputting correction signals for correcting the layout of pixels in each of the plurality of density planes; and combining the correction signals output from the density planes according to a predetermined combining rule.

* * * * *